US008186636B2

(12) United States Patent
Carnevali (10) Patent No.: US 8,186,636 B2
(45) Date of Patent: May 29, 2012

(54) CONFIGURABLE MOUNTING BRACKET (76) Inventor: Jeffrey D. Carnevali, Seattle, WA (US)

(*) Notice: Subject to any disclaimer, the term of this patent is extended or adjusted under 35 U.S.C. 154(b) by 256 days.

(21) Appl. No.: 11/811,586

(22) Filed: Jun. 11, 2007

(65) Prior Publication Data
US 2007/0241248 A1 Oct. 18, 2007

Related U.S. Application Data (63) Continuation-in-part of application No. 10/862,688, filed on Jun. 7, 2004, now abandoned.

(51) Int. Cl.
A47B 96/00 (2006.01)

(52) U.S. Cl. ............... 248/226.11; 248/231.31; 224/419

(58) Field of Classification Search ............... 248/219.4, 248/181.1, 226.11, 274.1, 230.2, 228.2, 231.31, 248/231.61, 228.5, 230.5; 224/413, 419, 224/420, 448, 456, 461
See application file for complete search history.

(56) References Cited

U.S. PATENT DOCUMENTS

| | | | | |
|---|---|---|---|---|
| 1,605,370 A * | 11/1926 | Parks | ............... | 242/130 |
| 1,614,417 A * | 1/1927 | Whipple | ............... | 74/557 |
| 1,890,853 A * | 12/1932 | Howard | ............... | 267/47 |
| 1,905,967 A * | 4/1933 | Milne | ............... | 248/63 |
| 2,176,060 A * | 10/1939 | Carlson | ............... | 439/522 |
| 2,282,685 A * | 5/1942 | Timbs | ............... | 24/135 A |
| 2,946,108 A * | 7/1960 | Bethea | ............... | 24/135 L |
| 3,142,501 A * | 7/1964 | Clark et al. | ............... | 285/184 |
| 3,328,575 A * | 6/1967 | Waldbauer | ............... | 362/308 |
| 3,470,528 A * | 9/1969 | Flynn et al. | ............... | 439/804 |
| 4,383,668 A * | 5/1983 | Hall | ............... | 248/63 |
| 4,458,976 A * | 7/1984 | Hudson et al. | ............... | 439/797 |
| 4,607,772 A | 8/1986 | Hancock | | |
| 5,014,940 A * | 5/1991 | Sherman | ............... | 248/74.1 |
| 5,187,744 A | 2/1993 | Richter | | |
| 6,484,913 B1 | 11/2002 | Hancock et al. | | |
| 6,561,473 B1 * | 5/2003 | Ianello | ............... | 248/219.4 |
| 6,588,637 B2 | 7/2003 | Gates et al. | | |
| 6,793,109 B2 | 9/2004 | Gates et al. | | |
| 2002/0166936 A1 | 11/2002 | Carnevali | | |
| 2003/0042282 A1 * | 3/2003 | Gates et al. | ............... | 224/560 |
| 2003/0146364 A1 * | 8/2003 | Gates et al. | ............... | 248/534 |
| 2003/0218112 A1 | 11/2003 | Gates et al. | | |
| 2004/0108348 A1 | 6/2004 | Barnes | | |

* cited by examiner

Primary Examiner — Kimberly Wood
(74) Attorney, Agent, or Firm — Charles J. Rupnick, Attorney at Law (57) ABSTRACT

A multiply configurable bracket formed of a substantially rigid elongated body having a groove oriented crosswise of the elongated body and formed partway therethrough, and a pair of fastener clearance passages formed through the body straddling the groove and oriented crosswise of both the elongated body and the groove. A first part-spherical ball mount is coupled to one end of the elongated body and is aligned substantially along a longitudinal axis thereof. A second part-spherical ball mount is coupled to the body opposite from the groove and oriented substantially crosswise to the longitudinal axis thereof. Both the first and second part-spherical ball mounts are formed of a resiliently deformable material with a substantially smooth outer surface.

20 Claims, 7 Drawing Sheets

CONFIGURABLE MOUNTING BRACKET

The present application is a Continuation-in-part of U.S. patent application Ser. No. 10/862,688 filed in the name of the inventor of the present application on Jun. 7, 2004, now abandoned which is incorporated herein by reference.

FIELD OF THE INVENTION

The present invention relates to a configurable mounting bracket, and in particular to a vehicle-mountable multiply configurable mounting bracket structured for clamping to a handlebar of a bicycle, motorcycle, all terrain vehicle or the like.

BACKGROUND OF THE INVENTION

Mounting brackets structured for clamping to a handlebar of a bicycle, motorcycle, all terrain vehicle or the like are generally well-known. Some of these known handlebar-mountable brackets are configurable to provide mounting apparatus at different positions relative to the vehicle handlebar. However, these known handlebar-mountable brackets have various limitations that limit their usefulness.

SUMMARY OF THE INVENTION

The present invention is a handlebar-mountable multiply configurable mounting bracket that overcomes limitations of the prior art for mounting instruments and other devices on a vehicle handlebar or another suitable portion of a vehicle.

The multiply configurable mounting bracket of the invention is provided by a substantially rigid elongated body having an arcuate groove formed in one longitudinal surface thereof and oriented crosswise to a longitudinal axis of the elongated body. A pair of elongated passages is formed through the body straddling the groove. An integral part-spherical ball mount is integrally formed with the body and projected from one end thereof, the first part-spherical ball mount being formed of a resiliently deformable material with a substantially smooth outer surface. A discrete part-spherical ball mount is coupled to the body opposite from the groove and oriented substantially crosswise to a longitudinal axis of the body, the discrete part-spherical ball mount being formed of a resiliently deformable material with a substantially smooth outer surface.

According to one aspect of the invention, the multiply configurable mounting bracket also includes a pair of spacers each structured with an elongated passage formed therethrough and mounted between the pair of elongated passages of the body and the handlebar on which the apparatus is mounted.

According to another aspect of the invention, the multiply configurable mounting bracket also includes an integral stem projected from the end of the elongated body. The integral stem is aligned substantially along a longitudinal axis thereof and has the resiliently deformable material of the first part-spherical ball mount molded thereon.

According to another aspect of the invention, the discrete second part-spherical ball mount is threadedly secured to the body. By example and without limitation, the body is formed with a passage therethrough between the arcuate groove and a surface of the body opposite from the groove. The discrete part-spherical ball mount has a threaded bore formed therein; and a threaded fastener resides in the passage formed through the body between the arcuate groove and a surface of the body opposite from the groove, the threaded fastener is threadedly engaged with the threaded bore formed in the discrete part-spherical ball mount. Alternatively, a discrete frame is interposed between the discrete part-spherical ball mount and the body. According to one example, the discrete part-spherical ball mount is threadedly coupled to the discrete frame.

Furthermore, the handlebar-mountable multiply configurable mounting bracket is alternatively embodied as a novel handlebar mounting bracket, having a substantially rigid saddle mount body having spaced apart opposing first and second surfaces with a pair of spaced apart apertures extending there through between the opposing first and second surfaces, the first surface further having a recessed surface portion formed therein substantially between the pair of apertures and oriented substantially crosswise of a first axis of the body. A part-spherical ball mount is projected from the second surface of the saddle mount body substantially opposite from the recessed surface portion formed in the first surface thereof. A substantially U-shaped rod is formed with first and second partially threaded leg portions projected from opposite ends of an arcuate throat portion, the partially threaded leg portions being sized pass through the apertures of the saddle mount body and further being spaced apart a distance corresponding to a spacing between the apertures. A substantially rigid anvil includes an arcuate groove shaped to substantially corresponding to the arcuate throat portion of the U-shaped rod and sized to nest therewith, the groove terminating in a clamping surface sized to fit between the first and second leg portions of the rod. First and second nuts are threaded to match the partially threaded leg portions of the rod.

According to another aspect of the novel handlebar mounting bracket, the pair of apertures of the saddle mount body each further form an oblong slot oriented substantially along the longitudinal axis of the body.

According to another aspect of the novel handlebar mounting bracket, the recessed surface portion formed in the first surface of the saddle mount body further forms an arched recess formed of first and second relatively inclined arched surfaces.

According to another aspect of the novel handlebar mounting bracket, the first surface of the saddle mount body further forms first and second substantially coplanar surfaces adjacent to opposing first and second ends of the body spaced apart on opposite sides of the recessed surface portion.

According to another aspect of the novel handlebar mounting bracket, the recessed surface portion formed in the first surface of the saddle mount body further forms an arcuate recess.

According to another aspect of the novel handlebar mounting bracket, the clamping surface of the anvil further forms an arched recess formed of first and second relatively inclined arched surfaces.

According to another aspect of the novel handlebar mounting bracket, the clamping surface of the anvil further forms first and second substantially coplanar surfaces spaced apart on opposite sides of the arched recess.

According to another aspect of the novel handlebar mounting bracket, the anvil further forms a pair of arcuate shoulder portions on opposite sides of the arcuate groove which terminate in the first and second substantially coplanar surfaces thereof.

Other aspects of the invention are detailed herein.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIGS. 12 and 13 are side and end views, respectively, of the novel handlebar-mounting bracket apparatus in operation with a vehicle handlebar or another bar, wherein FIG. 12 illustrates the anvil portion having a width dimension approximately three times a diameter thickness of the legs of the U-bolt, and FIG. 13 illustrates a radius dimension of an outer peripheral portion of the anvil's body portion being greater than an inner peripheral radius a throat portion of the U-bolt;

FIGS. 16, 17, 18 and 19 are orthogonal views of the anvil portion of the novel handlebar-mounting bracket apparatus, wherein

DETAILED DESCRIPTION OF PREFERRED EMBODIMENT

In the Figures, like numerals indicate like elements.

The present invention is a handlebar-mounting bracket embodied, by example and without limitation, as a rigid multiply configurable mounting bracket for securely and fixedly mounting accessories within easy reach of the vehicle rider. The bracket is provided by a substantially rigid elongated body that is formed of a substantially rectangular body formed with substantially orthogonal side faces and opposing end faces oriented substantially orthogonal to the side faces. An arcuate groove is formed partway through the body and oriented substantially crosswise of the elongated body with an opening in a first side face of the body. A pair of fastener clearance passages is formed through the body straddling the groove and is oriented substantially crosswise of both the elongated body and the groove. A first part-spherical ball mount is projected from one end face of the elongated body and is aligned substantially along a longitudinal axis of the body, the first part-spherical ball mount is formed of a resiliently deformable material with a substantially smooth outer surface. A second part-spherical ball mount is projected from a second side face of the body opposite from the first side face having the groove opening formed therein, and is oriented substantially crosswise to the longitudinal axis of the body. The second part-spherical ball mount is also formed of a resiliently deformable material with a substantially smooth outer surface.

According to one embodiment of the invention, the first part-spherical ball mount includes a stem integrally formed with the elongated body and projected from the end face thereof, and the resiliently deformable material is coupled to an end portion of the stem distal from the end face of the body.

According to another embodiment of the invention, the handlebar-mounting bracket includes a threaded joint between the end face of the elongated body and the first part-spherical ball mount projected therefrom, such that the first part-spherical ball mount is threadedly assembled to the elongated body.

According to another embodiment of the invention, the handlebar-mounting bracket includes a threaded joint between the second side face of the elongated body and the second part-spherical ball mount projected therefrom, such that the second part-spherical ball mount is threadedly assembled to the elongated body. According to one embodiment of the invention, the threaded joint between the second side face of the elongated body and the second part-spherical ball mount optionally includes a frame member interposed between the resiliently deformable material of the second part-spherical ball mount and the elongated body, wherein the frame is formed with a pair of fastener clearance passages that symmetrically straddle the resiliently deformable material of the second part-spherical ball mount and are substantially aligned with the pair of fastener clearance passages formed through the elongated body.

According to another embodiment of the invention, the handlebar-mounting bracket includes a pair of spacers each structured with a fastener clearance passage formed therethrough, the spacers being interposed between the pair of fastener clearance passages in the elongated body straddling the groove and a pre-existing instrument or other device on the handlebar.

According to another embodiment of the invention, the handlebar-mounting bracket includes a pair of bolts sized to pass through the pair of fastener clearance passages formed through the body and the fastener clearance passage formed the pair of spacers and extend at least a short distance therebeyond to engage pre-existing threaded holes on the handlebar. Alternatively, the bolts pass through matching holes in a U-clamp and are engaged by suitable threaded nuts.

Figure 1:
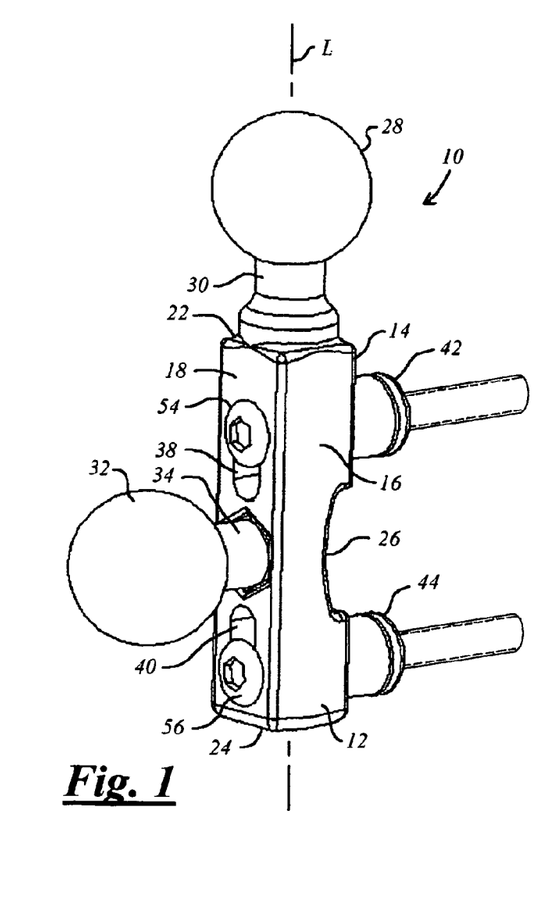
FIG. 1 is a front pictorial view that illustrates the invention embodied as a rigid multiply configurable vehicle handlebar-mounting bracket apparatus.
Figure 2:
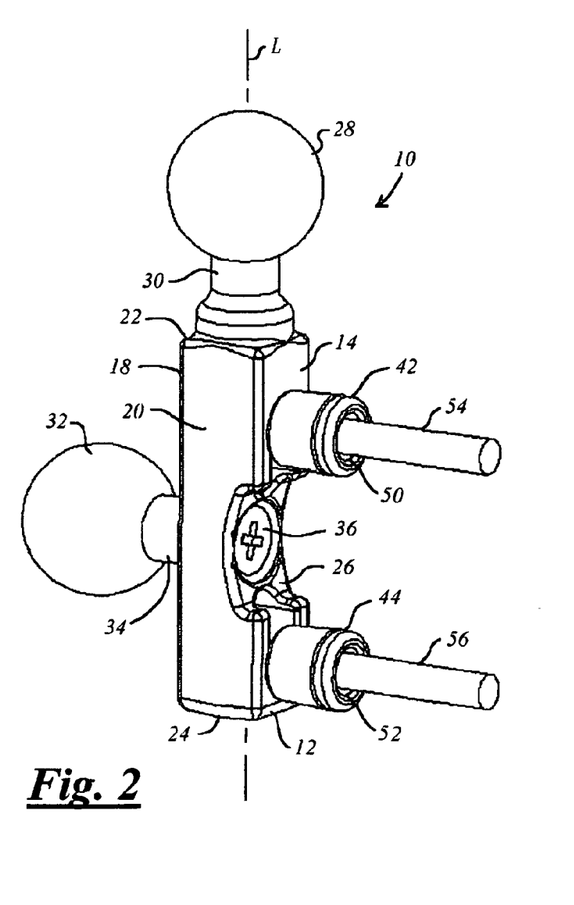
FIG. 2 is a rear pictorial view that illustrates the invention embodied as a rigid multiply configurable vehicle handlebar-mounting bracket apparatus.

FIG. 1 is a front pictorial view and FIG. 2 is a rear pictorial view that together illustrate the invention embodied, by example and without limitation, as a vehicle handlebar-mounting bracket apparatus 10 embodied as a rigid multiply configurable mounting bracket for securely and fixedly mounting accessories within easy reach of the vehicle rider. The handlebar-mounting bracket 10 is formed at its core by a substantially rigid body 12 having an elongated substantially rectangular form structured with four orthogonal sides or faces 14, 16, 18, 20 that are squared-off at opposite ends 22, 24. The edges and corners of the intersecting faces 14, 16, 18, 20 and ends 22, 24 are optionally broken, either by chamfers or fillets, to smooth the overall effect. Alternatively, the body 12 is cylindrical or another shape, and the ends 22, 24 are alternatively rounded, pointed, or another shape. The elongated rigid body 12 is optionally formed of hard plastic, aluminum, steel or another substantially rigid metallic or non-metallic material. An arcuate handlebar cutout or groove 26 is formed at or near the middle of one side or "mounting face" 14 thereof and is oriented crosswise of the elongated body 12. The arcuate structure renders the handlebar groove 26 suitable for either engaging a round or otherwise curved bar, such as a handlebar, or for clearing a pre-existing instrument.

A first part-spherical ball mount 28 is projected from one end surface 22 of the elongated rigid body 12 substantially along a longitudinal axis thereof. The first part-spherical ball mount 28 is formed of a resiliently deformable material with a substantially smooth outer surface, as described by Carnevali in U.S. Pat. No. 5,845,885, the complete disclosure of which is incorporated herein by reference. The first ball mount 28 is optionally integrally formed with the elongated body 12 by casting or overmolding the resiliently deformable material onto a short substantially rigid stem 30 integrally formed with the body 12 along its longitudinal axis L and extended from the end 22, as illustrated and described in detail in FIG. 3.

A second discrete non-integral part-spherical ball mount 32 that is also formed of the resiliently deformable material with a substantially smooth outer surface of the type described by Carnevali in U.S. Pat. No. 5,845,885 is provided on a second short substantially rigid internally-threaded stem 34 that is structured to be fastened to the apparatus body 12 to project from the face 18 opposite from the arcuate handlebar groove 26 that is formed in the mounting face 14. The stem 34 is secured to the body face 18 in a manner that resists rotation of the second ball mount 32 relative to the elongated body 12. For example, the second ball mount 32 is secured to the body face 18 by means of a threaded fastener or screw 36 through the body 12, as discussed in detail herein.

A pair of bolt clearance holes or oblong slots 38, 40 (shown) are formed through the body 12 between the mounting face 14 and the opposite face 18 from which the second ball mount 32 is projected. In order to facilitate both engaging a round or otherwise curved bar, such as a handlebar, and clearing a pre-existing instrument mounted on the handlebar, the bolt clearance holes or oblong slots 38, 40 are provided in positions symmetrically straddling the handlebar groove 26 and are oriented crosswise of both the longitudinal axis L of the elongated body 12 and the bore of the handlebar groove 26.

According to one embodiment of the invention, a pair of spacers 42, 44 is provided, one for each of the two bolt clearance holes or oblong slots 38, 40. The spacers 42, 44 are long enough to hold the body 12 away from the handlebar when another instrument or device is pre-existing on the handlebar, or to operate between the body 12 and a U-clamp 46 (shown in FIG. 8) or with a U-bolt 48 (shown in FIG. 9) for securing the handlebar-mounting bracket apparatus 10 against slipping and shifting. The spacers 42, 44 are small enough in cross-section to avoid interference both with pre-existing instruments or devices on the vehicle handlebar and straddled by the handlebar groove 26, and pre-existing objects surrounding the bracket apparatus 10. By example and without limitation, the spacers 42, 44 are each embodied as a short, thick-walled cylinder structured with a respective bolt clearance hole 50, 52 formed longitudinally therethrough. The spacers 42, 44 are optionally formed either integral with or separate from the body 12. When formed as discrete parts separate from the body 12, the spacers 42, 44 are optionally formed of a vibration damping material such as a soft rubber or a synthetic elastomeric material such as a low-durometer silicone or polyurethane material.

A pair of threaded fasteners 54, 56 is used to secure the body 12 of the bracket apparatus 10 to the vehicle handlebar. For example, the threaded fasteners 54, 56 are pre-existing mounting screws or bolts used to secure a pre-existing instrument or device on the vehicle handlebar, where the pre-existing instrument or device has a low profile in the vicinity of the mounting fasteners 54, 56. For example, the bolt clearance holes or oblong slots 38, 40 are sized to straddle the pre-existing instrument or device while permitting the threaded fasteners 54, 56 to align with mounting holes in the pre-existing instrument or device. Alternatively, the threaded fasteners 54, 56 may be longer screws or bolts sized to replace shorter pre-existing mounting screws or bolts such that the replacement threaded fasteners 54, 56 secure the body 12 of the bracket apparatus 10 to the vehicle handlebar while simultaneously securing the pre-existing instrument or device.

Figure 3:
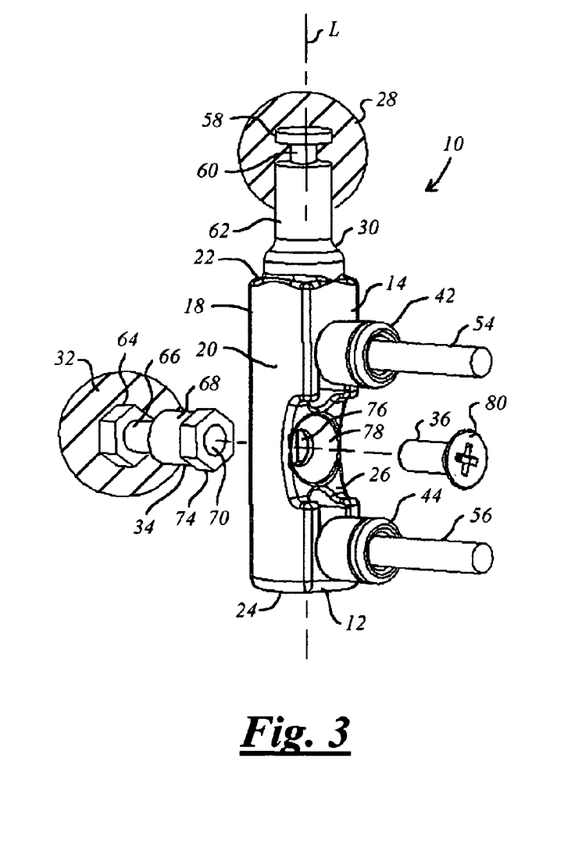
FIG. 3 is a rear exploded pictorial view that illustrates the invention embodied as a rigid multiply configurable vehicle handlebar-mounting bracket apparatus.
Figure 4:
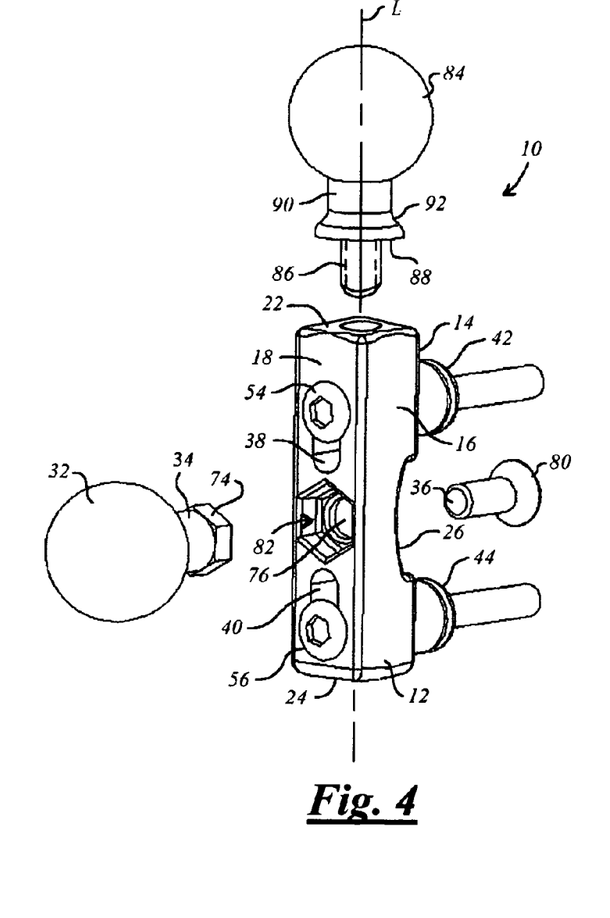
FIG. 4 is a front exploded pictorial view that illustrates the invention embodied as a rigid multiply configurable vehicle handlebar-mounting bracket apparatus wherein a discrete non-integral part-spherical ball mount is optionally substituted for the integral part-spherical ball mount illustrated in FIG. 1.

FIG. 3 is a rear exploded pictorial view and FIG. 4 is a front exploded pictorial view that together illustrate the first part-spherical ball mount 28 formed by casting or overmolding the resiliently deformable material onto the short substantially rigid stem 30 embodied as an integral part of the body 12 and projected along its longitudinal axis L from the end face 22. The integral stem 30 is provided with means for retaining the cast or overmolded resiliently deformable material forming the first part-spherical ball mount 28. By example and without limitation, the retaining means is provided by a button head portion 58 coupled by a necked-down portion 60 to a main shaft portion 62 of the stem 30. The button head 58 may be square or hex shaped, as shown for stem 34 of the second ball mount 32, or may have a knurled or roughened surface texture, any of which is sufficient to resist rotation of the resiliently deformable material relative to the stem 30.

FIGS. 3 and 4 also illustrate the second ball mount 32 as a discrete non-integral part-spherical ball mount that is provided on the second stem 34. The stem 34 is provided with a hex-shaped button head 64 for retaining the cast or overmolded resiliently deformable material. A neck-down portion 66 couples the button head 64 to the main shaft 68 which includes a threaded internal longitudinal bore 70 structured to accept the threaded fastener 36 which is, for example, a conventional flat head screw. The main shaft 68 includes means for fixing the stem shaft 68 against rotation relative to the apparatus body 12 during assembly of the threaded fastener 36. By example and without limitation, the means for fixing the stem shaft 68 against rotation is embodied in a hex-shaped lip 74 provided adjacent to the threaded bore 70.

As further illustrated in FIG. 3, a screw clearance hole 76 is formed through the apparatus body 12 substantially at the center of the handlebar groove 26 and is oriented crosswise of both the elongated apparatus body 12 and the bore of the handlebar groove 26, (i.e., crosswise of the face 14 of the body 12 having the handlebar groove 26 formed therein. The screw clearance hole 76 is structured with a first internal screw-head clearance relief 78 formed substantially concentric with the hole 76 within the handlebar groove 26. The screw-head clearance relief 78 is structured such that a flat head portion 80 of the screw 36 is flush or below the internal arcuate surface of the handlebar groove 26 so that it does not interfere with mounting the apparatus 10 onto a vehicle handlebar. The internal screw-head clearance relief 78 is formed as a conventional conical countersink when the screw 36 is a conventional flat head screw, or as a cylindrical counter-bore when the screw 36 is a pan, round, fillister, oval, hex, socket head or other conventional screw head.

As best illustrated in FIG. 4, the apparatus body 12 is structured with means for rotationally fixing the stem 34 of the second discrete non-integral ball mount 32 relative to the face 18 from which it is projected. By example and without limitation, the lip portion 74 of the stem main shaft 68 is structured to occupy a second external female stem-capture relief 82 formed in the elongated body 12 opposite from the handlebar groove 26 in a manner that resists rotation relative to the elongated body. The means for rotationally fixing the stem 34 is thus embodied by the second external female stem-capture relief 82 formed substantially concentric with the screw clearance hole 76 within the side surface or face 18 of the elongated body 12 opposite from the handlebar groove 26, i.e., the face 18 of the body 12 opposite from the face 14 having the handlebar groove 26 formed therein. The second external stem-capture relief 82 is formed with means for resisting rotation of the internally threaded shaft 68 secured therein by the threaded fastener 36 operating through the clearance hole 76. The means for resisting rotation of the shaft 68 is provided by the second external female stem-capture relief 82 embodied as a cooperating hexagonal female relief when the stem shaft 68 is embodied in the hex-shaped lip 74 adjacent to the threaded bore 70. Alternatively, the means for resisting rotation of the shaft 68 is provided by the second external female stem-capture relief 82 embodied as a cooperating square female relief when the stem shaft 68 is embodied in a square-shaped lip 74. The shaft 68 and second external stem-capture relief 82 may alternatively be structured as cooperating male and female star shapes, or other cooperating male and female shapes. According to one embodiment of the invention, the cooperating male and female shapes of the shaft 68 and second external stem-capture relief 82 are a cylindrical male shaft 68 and cooperating cylindrical female counter-bore 82 with a knurled or otherwise suitably roughened seating surface in the floor thereof According to yet another embodiment of the invention, a suitable lock washer is provided between the lip 74 of the male stem shaft 68 and the floor of the female counter-bore 82 for resisting rotation of the stem shaft 68 relative to the female stem-capture relief 82 and the face 18 of the elongated body 12.

As illustrated in FIG. 4, another discrete non-integral part-spherical ball mount 84 is optionally substituted for the first part-spherical ball mount 28. The discrete non-integral part-spherical ball mount 84 is secured to the end surface 22 of the elongated rigid body 12 by a threaded joint. For example, the discrete non-integral ball mount 84 is structured with a male threaded shaft 86 extended from a bottom face 88 of a shaft 90 of a stem 92 upon which the resiliently deformable material of the part-spherical ball mount 84 is cast or overmolded, as described herein. The male threaded shaft 86 is threadedly engaged with a cooperating female thread 94 formed in the end surface 22 of the apparatus body 12. Mechanical means, such as a suitable lock washer, are provided between the bottom face 88 of a shaft 90 and the body end surface 22 to resist relative rotation between the ball mount 84 and the apparatus body 12. Alternatively, chemical means thread-locking means are provided between the male and female threads 86, 94.

Figure 5:
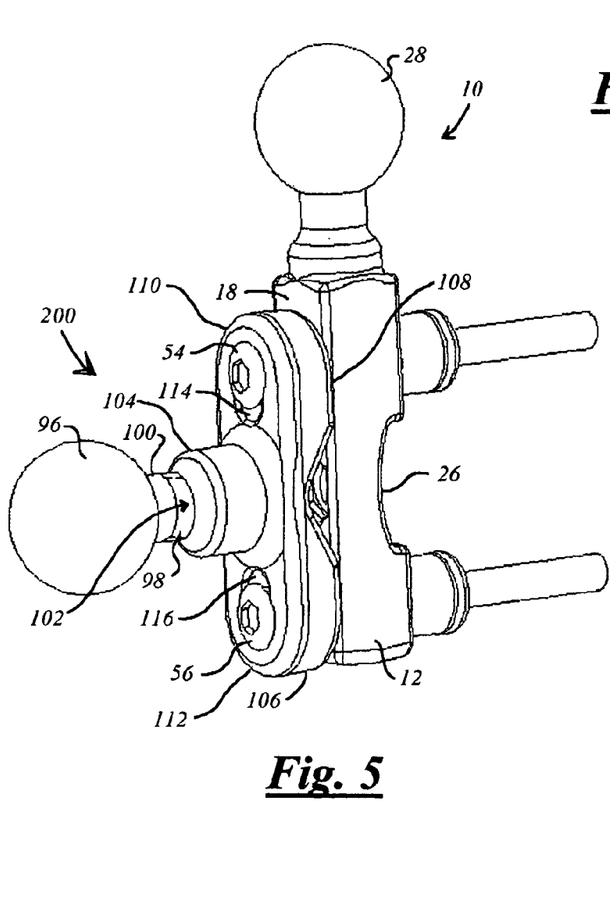
FIG. 5 is a front pictorial view that illustrates one alternative embodiment of the rigid multiply configurable vehicle handlebar-mounting bracket apparatus of the invention wherein a discrete non-integral part-spherical ball mount is optionally substituted for the discrete non-integral part-spherical ball mount illustrated in FIG. 1.

FIG. 5 illustrates one alternative embodiment of the invention wherein a saddle mount 200 is optionally substituted for the second part-spherical ball mount 32. By example and without limitation, saddle mount 200 is formed with another discrete non-integral part-spherical ball mount 96 having a male threaded shaft 98 extended from a stem 100 upon which the resiliently deformable material of the part-spherical ball mount 96 is cast or overmolded, as described herein. The male threaded shaft 98 is threadedly engaged with a cooperating female thread 102 formed within a boss portion 104 of a discrete frame 106. The frame 106 is formed with a substantially flat mounting surface 108 for mounting to the substantially flat side face 18 of the body 12. A pair of shoulders 110, 112 symmetrically straddle the threaded boss 108, the shoulders 110, 112 being formed with symmetrical bolt clearance holes or slots 114, 116 positioned to match the pair of bolt clearance holes or oblong slots 38, 40 provided in the body 12. The pair of threaded fasteners 54, 56 is passed through the symmetrical bolt clearance holes or slots 114, 116 and 38, 40 to simultaneously secure both the discrete ball mount 96 and the body 12 of the apparatus 10 to the vehicle handlebar, as described herein. Accordingly, the screw clearance hole 76 through the apparatus body 12 with the screw-head clearance relief 78 and the second external female stem-capture relief 82 can be eliminated along with the threaded fastener or screw 36 through the body 12, as discussed herein.

Figure 6:
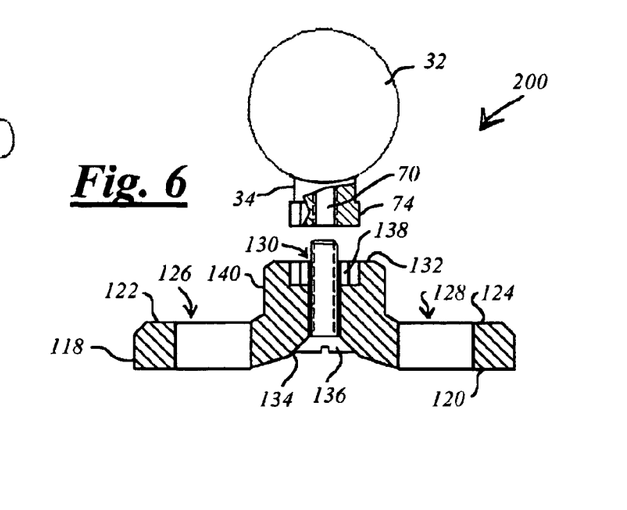
FIG. 6 illustrates one alternative embodiment of the discrete non-integral ball mount of the invention illustrated in FIG. 5.

FIG. 6 illustrates one alternative embodiment of the saddle mount 200 illustrated in FIG. 5. As saddle mount 200 is illustrates here, the second discrete non-integral part-spherical ball mount 32 is substituted for the discrete non-integral ball mount 96, and a different discrete frame 118 is substituted for the frame 106. The discrete frame 118 is similar to the frame 106 by being formed with a substantially planar mounting surface 120 for mounting to the substantially flat side face 18 of the body 12, and a pair of shoulders 122, 124 are formed with symmetrical bolt clearance holes or oblong slots 126, 128 positioned to match the pair of bolt clearance holes or oblong slots 38, 40 provided in the body 12. The pair of threaded fasteners 54, 56 is similarly passed through the symmetrical bolt clearance holes or oblong slots 126, 128 and 38, 40 to simultaneously secure both the discrete frame 118 and the body 12 of the apparatus 10 to the vehicle handlebar, as described herein. Accordingly, the screw clearance hole 76 in the apparatus body 12 can be eliminated along with the threaded fastener 36, as discussed herein.

Mounting of the second discrete ball mount 32 to the discrete frame 118 is modeled after the apparatus body 12 as illustrated in FIGS. 1-4. Accordingly, a screw clearance hole 130 is formed through the frame 118 between the mounting surface 120 and a ball mount mounting surface 132 formed opposite from the mounting surface 120 and includes a screwhead clearance relief 134 structured similarly to the screwhead clearance relief 78 for clearance of a flathead screw or another suitable fastener 136. The threaded fastener or screw 136 is passed through the clearance hole 130 and threadedly engaged to the threaded internal longitudinal bore 70 of the second discrete ball mount 32 for securing the ball mount 32 to the frame 118. The frame 118 includes an external female stem-capture relief 138 similar to the stem-capture relief 82 formed in the elongated body 12, whereby the lip portion 74 of the ball mount stem main shaft 68 is engaged to restrict rotation relative to the frame 118 and, in turn, relative to the apparatus body 12. The frame 118 is optionally formed with a boss 140 situated symmetrically between shoulders 122, 124 and the clearance holes or oblong slots 126, 128. When the frame 118 is formed with boss 140, the female stem-capture relief 138 is formed therein with the ball mount mounting surface 132 formed at the end thereof.

Figure 7:
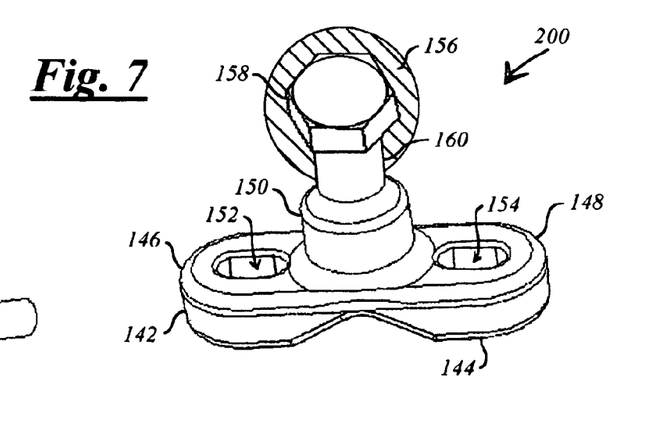
FIG. 7 illustrates another alternative embodiment of the discrete non-integral ball mount of the invention illustrated in FIG. 5.

FIG. 7 illustrates yet another alternative embodiment of the saddle mount 200 illustrated in FIG. 5. As illustrates here, a different discrete frame 142 is substituted for the frame 106 of saddle mount 200. The discrete frame 142 is similar to the frame 106 by being formed with a substantially flat mounting surface 144 for mounting to the substantially flat side face 18 of the body 12, and a pair of shoulders 146, 148 symmetrically straddles a stem 150. The shoulders 146, 148 are formed with symmetrical bolt clearance holes or oblong slots 152, 154 positioned to match the pair of bolt clearance holes or oblong slots 38, 40 provided in the body 12. The pair of threaded fasteners 54, 56 is similarly passed through the symmetrical bolt clearance holes or oblong slots 126, 128 and 38, 40 to simultaneously secure both the discrete frame 142 and the body 12 of the apparatus 10 to the vehicle handlebar, as described herein. Accordingly, the screw clearance hole 76 in the apparatus body 12 can be eliminated along with the threaded fastener 36, as discussed herein.

An alternative discrete non-integral ball mount 156 is formed on the stem 150 which may include means for retaining the cast or overmolded resiliently deformable material forming the alternative discrete ball mount 156. By example and without limitation, the retaining means is provided by a button head 158 for retaining the cast or overmolded resiliently deformable material. The button head 158, shown by example and without limitation as having a hexagonal shape, is coupled to a necked-down shaft portion 160 of the stem 150.

Figure 8:
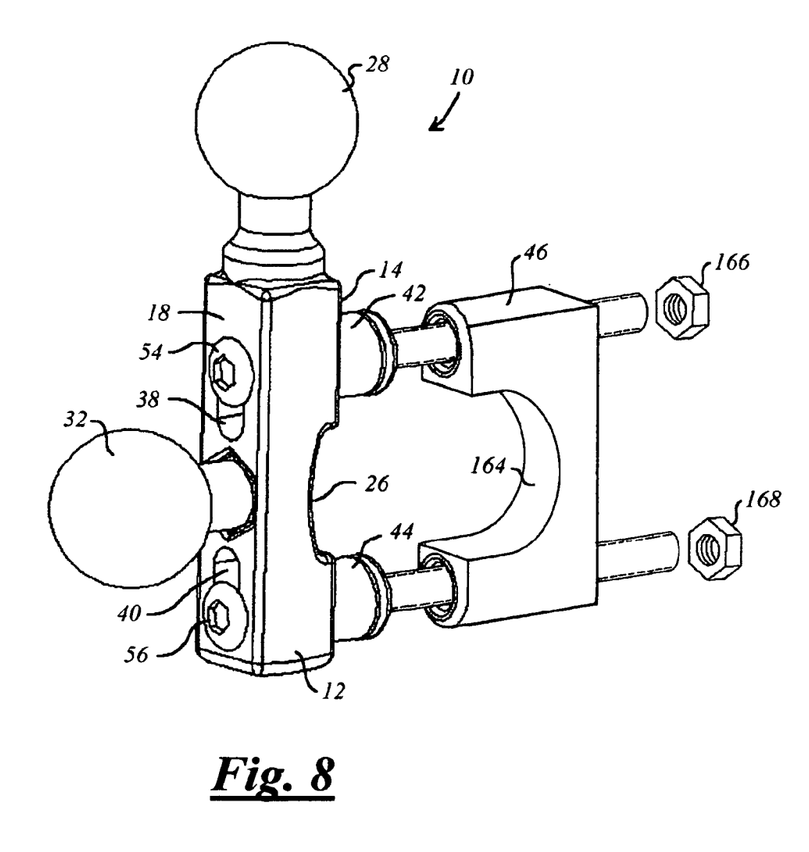
FIG. 8 is a front pictorial view that illustrates one alternative embodiment of the rigid multiply configurable vehicle handlebar-mounting bracket apparatus of the invention wherein the apparatus body is mounted to the vehicle handlebar directly by means of a U-clamp, a pair of threaded fasteners, and mating nuts.

FIG. 8 illustrates another alternative embodiment of the invention wherein the apparatus body 12 is mounted to the vehicle handlebar directly, rather than securing the body 12 through a pre-existing instrument or device, as described herein. In the embodiment of FIG. 8, the apparatus body 12 is positioned on the front of the vehicle handlebar with the handlebar groove 26 fitted against a front surface of the vehicle handlebar. The threaded fasteners 54, 56 are passed through the symmetrical oblong slots 38, 40 and extended on opposite sides of the vehicle handlebar. The U-clamp 46 is fitted over the threaded fasteners 54, 56 with a saddle portion 164 being fitted against a back surface of the vehicle handlebar opposite from the body 12 of the apparatus 10. A pair of nuts 166, 168 is threaded onto the respective threaded fasteners 54, 56 to secure the apparatus 10 to the vehicle handlebar with the ball mounts 28, 32 or the alternative ball mounts 84, 96 positioned as desired on the vehicle handlebar.

Figure 9:
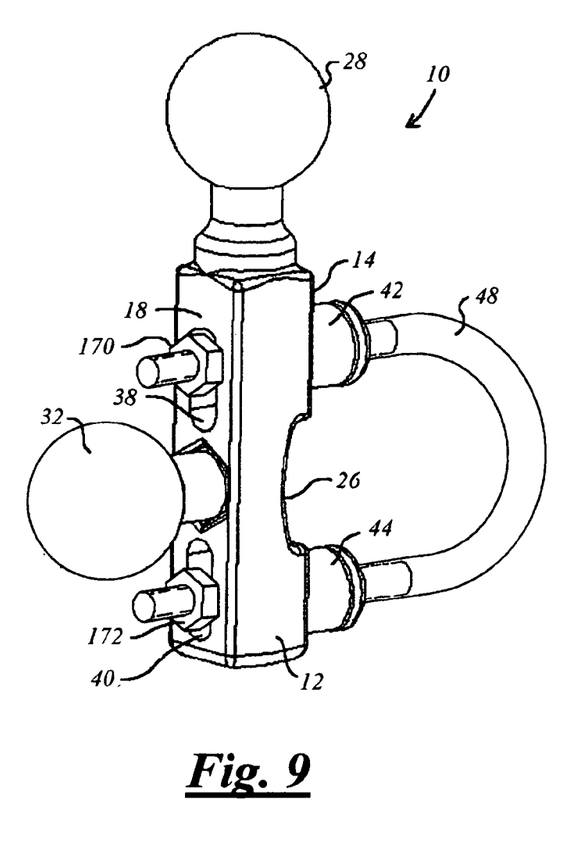
FIG. 9 is a front pictorial view that illustrates one alternative embodiment of the rigid multiply configurable vehicle handlebar-mounting bracket apparatus of the invention wherein the apparatus body is mounted to the vehicle handlebar directly by means of a threaded U-bolt and a pair of nuts.

FIG. 9 illustrates another alternative embodiment of the invention wherein the apparatus body 12 is secured to the vehicle handlebar directly using the threaded U-bolt 48 and a pair of nuts 170, 172 in place of the threaded fasteners 54, 56, U-clamp 46 and nuts 166, 168 shown in FIG. 8.

Figures 10, 11:
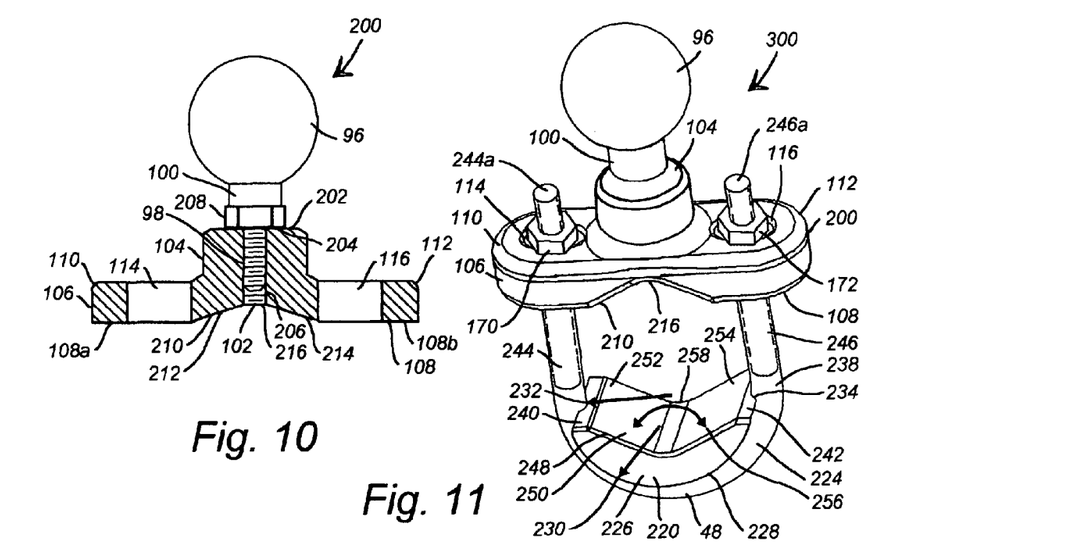
FIG. 10 illustrates another alternative embodiment of the discrete non-integral ball mount of the invention illustrated in FIG. 5.
FIG. 11 illustrates another configuration of the novel handlebar-mounting bracket apparatus provided as a combination of a saddle mount and an anvil secured with a U-bolt and a pair of nuts.

FIG. 10 is a cross-sectional view that illustrates the embodiment of the saddle mount 200 illustrated in FIG. 5. As illustrates here, saddle mount 200 is formed with another discrete non-integral part-spherical ball mount 96 is provided in combination with discrete frame 106. The discrete frame 106 is formed with substantially flat mounting surface 108 for mounting to the substantially flat side face 18 of the body 12, and a pair of shoulders 110, 112 are formed with symmetrical oblong bolt clearance holes or slots 114, 116 positioned to match the pair of bolt clearance holes or oblong slots 38, 40 provided in the body 12. The pair of threaded fasteners 54, 56 is passed through the symmetrical bolt clearance holes or oblong slots 114, 116 and 38, 40 to simultaneously secure both the discrete frame 106 and the body 12 of the apparatus 10 to the vehicle handlebar, as described herein. Accordingly, the screw clearance hole 76 in the apparatus body 12 can be eliminated along with the threaded fastener 36, as discussed herein.

Mounting of the second discrete ball mount 96 to the discrete frame 106 is provided by an internally threaded female fastener or screw hole 102 is formed through the frame 106 between the mounting surface 108 and a ball mount mounting surface 202 formed opposite from the mounting surface 108. However, threaded hole 102 is optionally formed from the ball mount mounting surface 202 as a blind hole that does not penetrate to the mounting surface 108. The frame 106 is optionally formed with boss portion 104 situated symmetrically between shoulders 110, 112 and the clearance holes or oblong slots 114, 116. When the frame 106 is formed with boss 104, the threaded hole 102 is formed therein with the ball mount mounting surface 202 formed at the end thereof opposite from the mounting surface 108.

The discrete non-integral part-spherical ball mount 96 is secured to the ball mount mounting surface 202 of the discrete frame 106 by a threaded joint. For example, the discrete non-integral ball mount 96 is structured with male threaded stud 98 extended from a bottom face 204 of stem 100. As illustrated, stem 100 is necked-down smaller than the part-spherical ball mount 96 and has the resiliently deformable material of the part-spherical ball mount 96 cast or overmolded thereon, as described herein. The male threaded stud 98 is threadedly engaged with cooperating female threads 206 formed in female fastener or screw hole 102 through the ball mount mounting surface 202 of the frame 106. Mechanical means, such as a suitable lock washer, are provided between the bottom face 204 of stem 100 and the ball mount mounting surface 202 to resist relative rotation between the ball mount 96 and the frame 106. Alternatively, chemical means thread-locking means are provided between the male and female threads 98, 206. The stem 100 portion of the discrete ball mount 96 optionally includes means for rotationally tightening male and female threads 98, 206. By example and without limitation, the means for rotationally tightening the stem 100 portion of the discrete ball mount 96 is embodied in a hex-shaped lip 208 provided adjacent to the threaded stud 98.

As illustrated in FIG. 5, and more clearly shown here, a shaped handlebar clamping surface portion 210 optionally interrupts the mounting surface 108 opposite from the boss 104, when present. When present, the handlebar clamping surface 210 is positioned substantially central of the mounting surface 108 between the respective shoulders 110, 112 of the frame 106. The handlebar clamping surface 210 is configured to locate on a substantially round or other non-flat surface other than the body 12 of the vehicle handlebar-mounting bracket apparatus 10. By example and without limitation, the handlebar clamping surface 210 is formed as a groove or recess in the mounting surface 108 substantially crosswise of the frame 106. By example and without limitation, the clamping surface 210 is an arched recess formed of two opposing substantially planar surfaces or "flats" 212 and 214 each contiguous with respective spaced apart substantially planar portions 108a and 108b of the mounting surface 108 formed of the respective shoulders 110, 112 of the frame 106. The arched flats 212, 214 are mutually inclined toward one another substantially symmetrically relative to the shoulders 110, 112 of the frame 106 and the oblong bolt clearance holes or oblong slots 114, 116. The arched flats 212, 214 are contiguous with one another along a mutual bordering edge. Else, a root portion 216 of the handlebar clamping surface 210 between the arched flats 212, 214 is optionally either formed as a substantially flat or rounded valley surface. Alternatively, the handlebar clamping surface 210 is formed as an arcuate handlebar cutout or groove substantially identically to the arcuate handlebar cutout or groove 26 provided on the mounting face 14 of the elongated body 12.

FIG. 11 illustrates another configuration of handlebar-mounting bracket apparatus 300 provided as a combination of the saddle mount 200 and an anvil 220 secured with the U-bolt 48 and the pair of nuts 170, 172. The saddle mount 200 used in combination with the anvil 220, U-bolt 48 and nuts 170, 172 is illustrated here for clarity by example and without limitation as the embodiment illustrated in FIG. 7 having the ball mount 156 cast or overmolded on the stem 150 of the discrete frame 142, as discussed herein. However, the saddle mount 200 is optionally provided as either the alternative embodiment illustrated in FIG. 6 with the ball mount 32 secured to the discrete frame 118 by the threaded fastener or screw 136, or the embodiment with the ball mount 96 secured to the frame 106 by the male threaded stud 98, as illustrated in FIG. 5 and in cross-section in FIG. 10.

The handlebar-mounting bracket apparatus 300 is useful for securing the ball mount 96 to a vehicle handlebar 222 when a pre-existing instrument or device having pre-existing mounting fasteners 54, 56 is not available on the vehicle handlebar 222 for securing the vehicle handlebar-mounting bracket apparatus 10 disclosed herein. Accordingly, the threaded U-bolt 48 and a pair of nuts 170, 172 are screws or bolts used to secure the saddle mount 200 to the vehicle handlebar 222 directly. The anvil 220 fits in a throat portion 224 of the U-bolt 48 with the handlebar 222 between it and the saddle mount 200, as illustrated herein.

As illustrated here, and more clearly shown in subsequent figures, by example and without limitation the anvil 220 is formed with an arcuate body portion 226 formed in a partial cylinder and extending to as much as a half circle, but is optionally less. The body portion 226 is formed with an outer peripheral portion 228 having a radius 230 greater than an inner peripheral radius 232 the throat portion 224 of the U-bolt 48, as more clearly shown in subsequent figures. An arcuate groove 234 extends completely around the periphery 228 of body portion 226. The arcuate groove 234 is formed with an inner radius 236 substantially matched to the inner peripheral radius 232 of the throat portion 224 of the U-bolt 48 and is shaped to match the bent cylindrical shape of the throat portion 224 of the U-bolt 48, as more clearly shown in subsequent figures. The anvil body portion 226 is wider than the thickness of a rod 238 which forms the U-bolt 48. Accordingly, the anvil body portion 226 terminates in substantially coplanar flat termination surfaces 240 and 242 that extend on either side of respective substantially straight threaded leg portions 244 and 246 of the U-bolt 48 that extend substantially parallel from opposite ends of the throat portion 224, such that the anvil 220 nests in the U-bolt 48 with the throat portion 224 lying in the arcuate groove 234 and the termination surfaces 240, 242 spreading on either side of the legs 244, 246, respectively. The anvil 220 is effectively captured between the legs 244, 246 of the U-bolt 48 and nests so effectively in the U-bolt 48 that the arcuate groove 234 rocks in the throat portion 224 while remaining is substantially constant contact.

An inner clamping surface 248 of the anvil body portion 226 opposite from the arcuate groove 234 is optionally formed with a shaped handlebar clamping surface portion 250 substantially central of the clamping surface 248 between the substantially coplanar flat termination surfaces 240, 242. When present, the shaped clamping surface portion 250 is configured to locate on a substantially round or other non-flat surface such as a vehicle handlebar. By example and without limitation, the shaped clamping surface portion 250 is formed as a groove or recess in the clamping surface 248 substantially crosswise of the body portion 226 and the arcuate groove 234. By example and without limitation, the groove shaped clamping surface portion 250 is an arched recess formed of two opposing substantially planar surfaces or "flats" 252 and 254 each contiguous with a respective one of the termination surfaces 240, 242 of the body portion 226. The arched flats 252, 254 are mutually inclined toward one another substantially symmetrically relative to the termination surfaces 240, 242 and the opposing arcuate groove 234 of the body portion 226. The arched flats 252, 254 are optionally inclined to any degree relative to the respective termination surfaces 240, 242 to provide any selected included angle 256. By example and without limitation, the arched flats 252, 254 are inclined about 30 degrees from the respective termination surfaces 240, 242 such that the included angle 256 formed there between is a shallow angle of about 120 degrees. However, the arched flats 252, 254 are optionally inclined to a greater or lesser degree relative to the respective termination surfaces 240, 242, as illustrated in subsequent figures. The arched flats 252, 254 are contiguous with one another along a mutual bordering edge. Else, a root portion 258 of the shaped clamping surface portion 250 is formed between the flats 252, 254, the root portion 258 being optionally formed as either a substantially flat or rounded valley surface. Alternatively, the shaped clamping surface portion 250 is formed as an arcuate handlebar cutout or groove substantially identically to the arcuate handlebar cutout or groove 26 provided on the mounting face 14 of the elongated body 12.

In operation, the handlebar-mounting bracket apparatus 300 is used to provide the ball mount 96 in a convenient location on the vehicle handlebar 222 or another bar. The anvil 220 is nested between the legs 244, 246 of the U-bolt 48 with the throat portion 224 lying in the arcuate groove 234. The U-bolt 48 and anvil 220 are fitted around the vehicle handlebar 222 or another bar with the legs 244, 246 of the U-bolt 48 around the bar 222 and the inner clamping surface 248 of the anvil 220 seated against the bar 222. The U-bolt legs 244, 246 are long enough to extend past the bar 222 such that the saddle mount 200 can be secured thereto. Accordingly, the clearance holes or oblong slots 114, 116 in the shoulders 110, 112 of the frame 106 are fitted over threaded end portions 244a and 246a of the respective legs 244 and 246 extended around the bar 222. The handlebar clamping surface 210 of the frame's mounting surface 108 is seated against the bar 222 opposite from the anvil 220. The nuts 170, 172 are threaded onto the threaded end portions 244a, 246a of the respective legs 244, 246. When the bar 222 is cylindrical, as illustrated herein, the nuts 170, 172 are optionally left slightly loose to permit rotation of the saddle mount 200 to a selected relative position and rotational orientation. The handlebar-mounting bracket apparatus 300 is also useful when the bar 222 is non-cylindrical, e.g., square, hexagonal, octagonal, etc. When the bar 222 is non-cylindrical, the saddle mount 200 and anvil 220 are seated on the bar 222 in the desired rotational orientation before the nuts 170, 172 are threaded onto the threaded end portions 244a, 246a of the respective legs 244, 246; else, initially the nuts 170, 172 may only be threaded very loosely to permit rotation of the saddle mount 200 and anvil 220 around the bar 222 to the desired rotational orientation. When the desired relative position and rotational orientation of the saddle mount 200 and its ball mount 96 is achieved, the nuts 170, 172 are tightened to secure the handlebar-mounting bracket apparatus 300 to the bar 222. Optional washers may be installed over the threaded end portions 244a and 246a of the respective legs 244 and 246 between the nuts 170, 172 and the shoulders 110, 112 of the frame 106.

Figure 12:
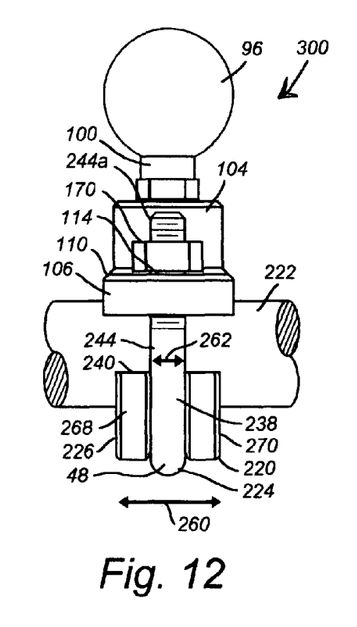
Figure 13:
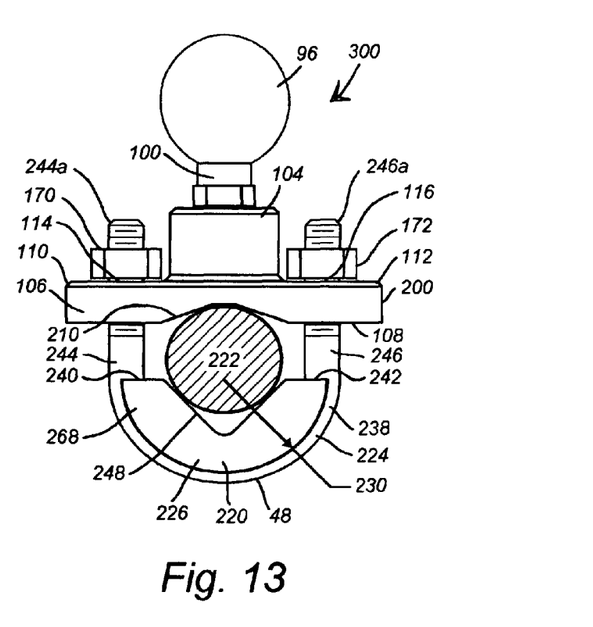

FIGS. 12 and 13 are side and end views, respectively, of the handlebar-mounting bracket apparatus 300 in operation with vehicle handlebar 222 or another bar. FIG. 12 illustrates the anvil 220 having a width dimension 260 approximately three times a diameter thickness 262 of the legs 244, 246 of the U-bolt 48. Width dimension 260 is substantially arbitrary, but is at least greater than diameter thickness 262 so that substantially coplanar flat termination surfaces termination surfaces 240 and 242 are extended on either side of the legs 244, 246. The anvil 220 thus spreads the clamping load exerted by the U-bolt 48 across a wider portion of the bar 222, which avoids damage to the bar 222 and does not leave mark when the handlebar-mounting bracket apparatus 300 is removed. However, if the handlebar-mounting bracket apparatus 300 is to operate merely as a spacer to reduce extension of the U-bolt legs 244, 246 relative to the frame 106, then the width dimension 260 is optionally reduced to the same or less than the diameter thickness 262 of the legs 244, 246. The termination surfaces 240 and 242 are thus reduced to mere blades with the arcuate groove 234 extending less than halfway around the throat portion 224 of the U-bolt 48. Accordingly, the width dimension 260 of the anvil 220 being optionally reduced to the same or less than the diameter thickness 262 of the legs 244, 246 of the U-bolt 48 is also contemplated and may be substituted for greater width dimensions 260 without deviating from the scope and intent of the present invention.

FIG. 13 illustrates the radius 230 of the outer peripheral portion 228 of the body portion 226 being formed greater than the inner peripheral radius 232 the throat portion 224 of the U-bolt 48.

Figures 14, 15, 16:
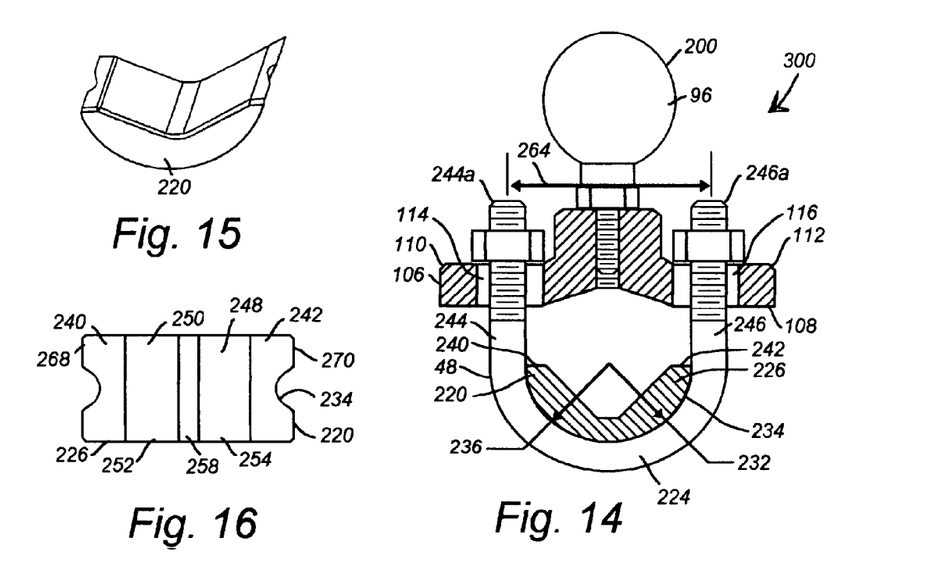
FIG. 14 is a cross-section view of both the saddle mount and the anvil of the novel handlebar-mounting bracket apparatus wherein a peripheral arcuate groove in the anvil's body portion extends completely around the periphery of the body portion between substantially coplanar termination surfaces, and an inner radius of the arcuate groove is substantially matched to the inner peripheral radius of the throat portion of the U-bolt.
FIG. 15 is a perspective view of the anvil portion of the novel handlebar-mounting bracket apparatus.
FIG. 16 is a top view showing the arcuate groove formed in the periphery of the anvil body portion and intersecting the substantially coplanar termination surfaces portions.

FIG. 14 is a cross-section view of both the saddle mount 200 and the anvil 220 of the handlebar-mounting bracket apparatus 300. The arcuate groove 234 extends completely around the periphery 228 of body portion 226 between substantially coplanar termination surfaces 240 and 242. The inner radius 236 of the arcuate groove 234 is substantially matched to the inner peripheral radius 232 of the throat portion 224 of the U-bolt 48.

The shoulders 110, 112 of the frame 106 are formed with oblong clearance slots 114, 116 such that the saddle mount 200 accommodates U-bolts 48 having misaligned threaded end portions 244a, 246a of slightly skewed or non-parallel legs 244, 246. The oblong clearance slots 114, 116 are optionally further sized to accommodate different commercially available U-bolts 48 having an incremental range of different center-to-center spacings 264 of the legs 244, 246. The clearance holes 114, 116 are optionally overly enlarged round clearance holes. Such larger round clearance holes 114, 116 require wider shoulders 110, 112 and an overall enlarged frame 106. However, such larger round clearance holes 114, 116 and overall enlarged frame 106 are also contemplated and may be substituted for oblong clearance slots 114, 116 without deviating from the scope and intent of the present invention.

Over the range of incrementally different sizes of U-bolt 48 accommodated by the oblong clearance slots 114, 116 or oversize round clearance holes of the frame 106, the throat inner peripheral radius 232 of the U-bolt throat portion 224 also varies incrementally. The anvil 220 is optionally formed in an incremental range of sizes matched to the accommodated size range of U-bolt 48 by the saddle mount 200. The anvil 220 is selected to have the arcuate groove 234 with the inner peripheral radius 236 matched to the inner peripheral radius 232 the throat portion 224 of the selected U-bolt 48. Alternatively, the anvil 220 is selected to have the arcuate groove 234 with the inner peripheral radius 236 matched to the inner peripheral radius 232 the throat portion 224 of the minimum U-bolt 48 accommodated by the saddle mount 200. The arcuate groove 234 of the selected anvil 220 will be small compared to the throat portion 224 of the largest U-bolt 48 accommodated by the saddle mount 200. However, even the undersized anvil 220 is expected to perform the intended function adequately.

FIG. 15 is a perspective view of the anvil portion 220 of the novel handlebar-mounting bracket apparatus 300.

FIGS. 15, 16, 17 and 18 are orthogonal views of the anvil 220 of the handlebar-mounting bracket apparatus 300. FIG. 16 is a top view showing the arcuate groove 234 formed in the periphery 228 of the anvil body portion 226 and intersecting the substantially coplanar termination surfaces portions 240, 242. The flats 252, 254 of the shaped clamping surface portion 250 extend substantially symmetrically from the termination surfaces 240, 242 of the body portion 226 and join along the root portion 258 formed there between.

Figure 17:
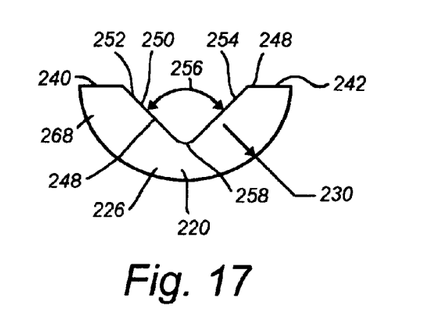
FIG. 17 is a front view showing the periphery of the anvil body portion terminating in substantially coplanar flat termination surfaces.

FIG. 17 is a front view showing the periphery 228 of the anvil body portion 226 terminating in substantially coplanar flat termination surfaces 240, 242. The arched flats 252, 254 of the shaped clamping surface portion 250 extend substantially symmetrically from the substantially coplanar termination surfaces 240, 242 of the body portion 226 and form the included angle 256 there between. Here, the arched flats 252, 254 are inclined about 45 degrees from the respective termination surfaces 240, 242 such that the included angle 256 formed there between is a square or right angle of about 90 degrees. However, the arched flats 252, 254 are optionally inclined to a greater or lesser degree relative to the respective substantially coplanar flat termination surfaces 240, 242, as illustrated herein. Alternatively, as discussed herein, the shaped clamping surface portion 250 is optionally formed as an arcuate handlebar cutout or groove substantially identically to the arcuate handlebar cutout or groove 26 provided on the mounting face 14 of the elongated body 12. Here, the root portion 258 joining the arched flats 252, 254 of the shaped clamping surface portion 250 is illustrated as being arcuate.

Figure 18:
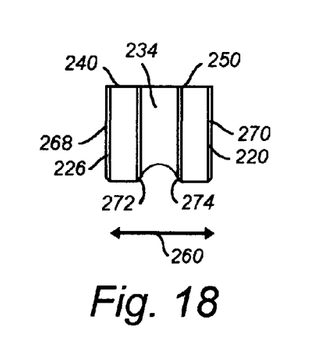
FIG. 18 is an end view showing the arcuate groove formed in the periphery of the anvil body portion and intersecting the termination surfaces.

FIG. 18 is an end view showing the arcuate groove 234 formed in the periphery 228 of the anvil body portion 226 and intersecting the termination surfaces 240, 242. The overall width dimension 260 of the anvil 220 is illustrated here as approximately three times a diameter width 266 of the groove 234, which is about the same as the diameter thickness 262 of the legs 244, 246 of the U-bolt 48, as discussed herein. Accordingly, half round shoulders 268 and 270 bordering the groove 234 and forming the respective termination surfaces 240 and 242 are each sized about the same width 266 of the groove 234. As discussed herein, the overall width dimension 260 of the anvil body portion 226 is substantially arbitrary, but is at least greater than diameter thickness 262 so that half round shoulders 268 and 270 forming respective termination surfaces 240 and 242 are provided on either side of the legs 244, 246. A respective lead-in 272 and 274 is optionally formed between the peripheral groove 234 and each of the respective half round shoulders 268, 270 on either side thereof.

Figure 19:
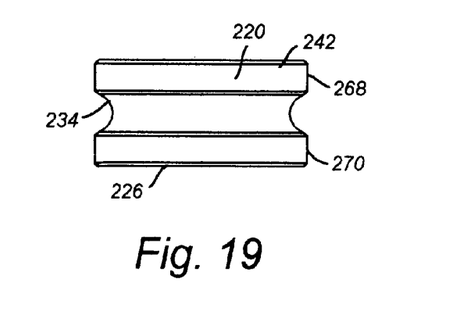
FIG. 19 is a bottom view showing arcuate groove formed in the periphery of the anvil body portion between half round shoulders and showing the arcuate groove extending completely around the periphery of the anvil's body portion.

FIG. 19 is a bottom view showing arcuate groove 234 formed in the periphery 228 of the anvil body portion 226 between the half round shoulders 268, 270. The arcuate groove 234 is shown here to extend completely around the periphery 228 of body portion 226.

Figures 20, 21, 22:
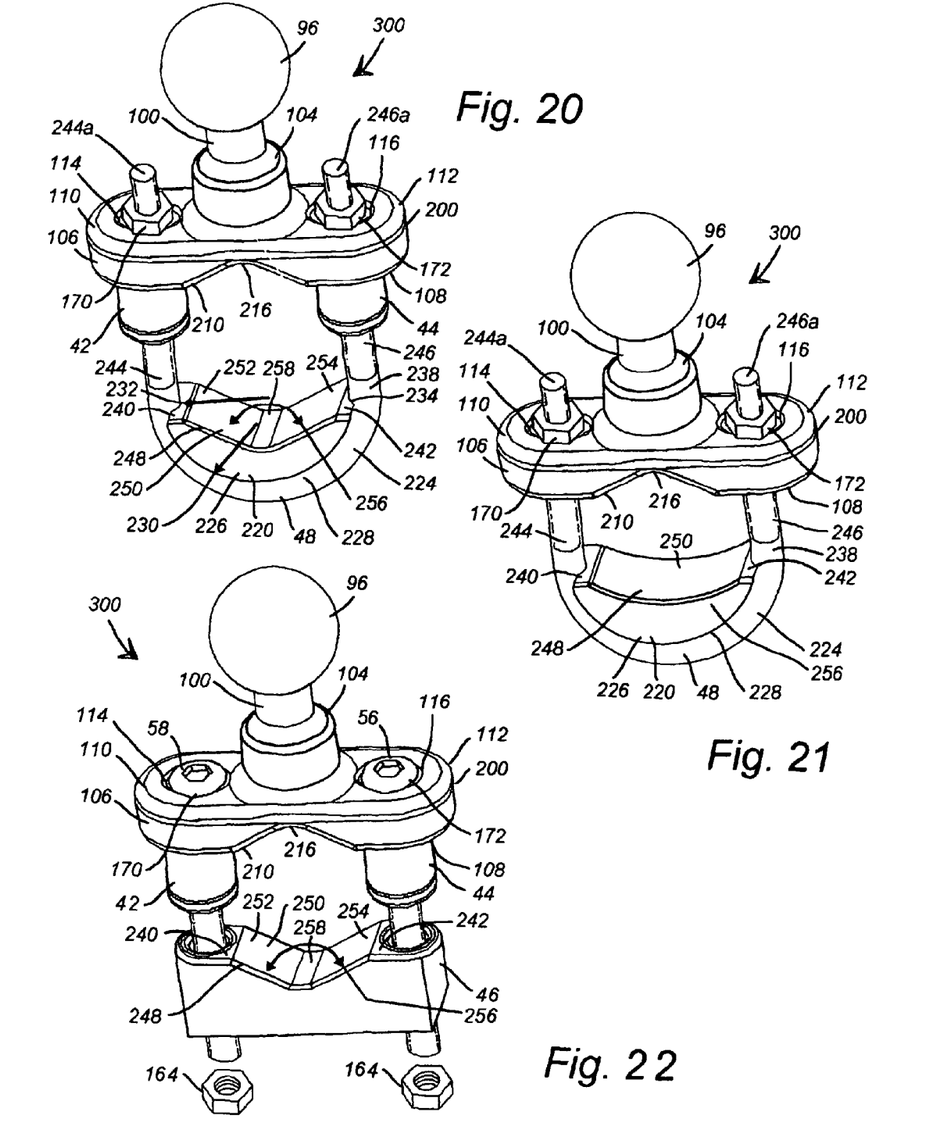
FIG. 20 illustrates the novel handlebar-mounting bracket apparatus having the saddle mount and anvil used in combination with a pair of spacers.
FIG. 21 illustrates the novel handlebar-mounting bracket apparatus having a shaped clamping surface portion of the anvil portion thereof being alternatively configured as an arcuate handlebar cutout or groove.
FIG. 22 illustrates another alternative embodiment of the novel handlebar-mounting bracket apparatus wherein a U-clamp is substituted for the anvil portion, and a pair of threaded fasteners is substituted for the U-bolt.

FIG. 20 illustrates the handlebar-mounting bracket apparatus 300 having the saddle mount 200 and anvil 220 used in combination with the pair of spacers 42, 44. The pair of spacers 42, 44 is provided, one for each of the two bolt clearance holes or oblong slots 114, 116 in the frame 106 of the saddle mount 200. The spacers 42, 44 are long enough to hold the frame 106 away from the handlebar when another instrument or device is pre-existing on the handlebar frame 106. The spacers 42, 44 sized to slip over the threaded end portions 244*a*, 246*a* of the respective legs 244, 246 of the U-bolt 48, yet are small enough in cross-section to avoid interference both with pre-existing instruments or devices on the vehicle handlebar and straddled by the arched or grooved clamping surface 210, and pre-existing objects surrounding the bracket apparatus 300. By example and without limitation, the spacers 42, 44 are each embodied as a short, thick-walled cylinder structured with a respective bolt clearance hole 50, 52 formed longitudinally therethrough. The spacers 42, 44 are optionally formed either integral with or separate from the frame 106 of the saddle mount 200. When formed as discrete parts separate from the frame 106, the spacers 42, 44 are optionally formed of a vibration damping material such as a soft rubber or a synthetic elastomeric material such as a low-durometer silicone or polyurethane material.

FIG. 21 illustrates the handlebar-mounting bracket apparatus 300 wherein the shaped clamping surface portion 250 is alternatively configured as an arcuate handlebar cutout or groove substantially identical to the arcuate handlebar cutout or groove 26 provided on the mounting face 14 of the elongated body 12, as discussed herein.

FIG. 22 illustrates another alternative embodiment of the handlebar-mounting bracket apparatus 300 wherein the U-clamp 46, as described herein, is substituted for the anvil 220, and the pair of threaded fasteners 54, 56 is substituted for the U-bolt 48. In operation, the saddle mount 200 is positioned on the front of the vehicle handlebar with the handlebar clamping surface 210 of the frame 106 fitted against a front surface of the vehicle handlebar 222. The threaded fasteners 54, 56 are passed through the symmetrical oblong slots 114, 116 and extended on opposite sides of the vehicle handlebar 222. The U-clamp 46 is fitted over the threaded fasteners 54, 56 with a saddle portion 164 being fitted against a back surface of the vehicle handlebar 222 opposite from the saddle mount 200. The pair of nuts 166, 168 is threaded onto the threaded fasteners 54, 56 to secure the frame 106 of the saddle mount 200 to the vehicle handlebar 222 with the ball mount 96 positioned as desired on the vehicle handlebar 222.

Alternatively, as illustrated here, the inner clamping surface 248 of the anvil 220 is substituted for the saddle portion 164 of the U-clamp 46, whereby the saddle portion 164 is modified to include the shaped clamping surface portion 250 having arched flats 252, 254 joined by the root portion 258 and forming the included angle 256 therebetween, as discussed herein.

While the preferred embodiment of the invention has been illustrated and described, it will be appreciated that various changes can be made therein without departing from the spirit and scope of the invention. For example, materials may be substituted for the different components of the apparatus of the invention without departing from the spirit and scope of the invention. Furthermore, as at least one embodiment of the invention is provided wherein the bracket is mounted using pre-existing bolt or screws 54, 56 that secure a pre-existing instrument or other device, the apparatus 10 of the invention is not limited to mounting on a vehicle handlebar but is structured for mounting in any position on any ground, marine or airborne vehicle having a pre-existing instrument or device with a suitably arranged mounting bolt pattern wherein a pair of pre-existing mounting bolts is matched by the bolt clearance holes or oblong slots 38, 40 through the apparatus body 12. Therefore, the inventor makes the following claims.

What is claimed is:

1. A handlebar mounting bracket, comprising:

a substantially rigid saddle mount body comprising spaced apart opposing first and second surfaces and first and second spaced apart shoulder portions formed adjacent to opposing first and second ends of the body along a first axis thereof with a pair of spaced apart apertures extending there through, the first surface further comprising a recessed clamping surface portion formed therein substantially between the shoulder portions and the pair of apertures extending
there through and oriented substantially crosswise of the first axis of the body;

a substantially U-shaped rod formed with first and second partially threaded leg portions projected from opposite ends of an arcuate throat portion, the partially threaded leg portions being sized pass through the apertures of the saddle mount body and further being spaced apart a distance corresponding to a spacing between the apertures;

a substantially rigid anvil comprising an arcuate groove shaped to substantially corresponding to the arcuate throat portion of the U-shaped rod and sized to nest therewith, the groove terminating in a clamping surface sized to fit between the first and second leg portions of the rod, and wherein the clamping surface further comprises a pair of oppositely inclined arched flats forming therebetween an included angle;
a part-spherical ball mount projected from the second surface of the saddle mount body substantially opposite from the recessed clamping surface portion formed in the first surface thereof; and
means for securing the partially threaded leg portions of the U-bolt relative to the saddle mount body.

2. The bracket of claim 1 wherein the pair of apertures of the saddle mount body each further comprises an oblong slot oriented substantially along the longitudinal axis of the body.

3. The bracket of claim 2 wherein the recessed surface portion formed in the first surface of the saddle mount body further comprises an arched recess formed of first and second relatively inclined arched surfaces.

4. The bracket of claim 3 wherein the first surface of the saddle mount body further comprises first and second substantially coplanar surfaces adjacent to opposing first and second ends of the body spaced apart on opposite sides of the recessed surface portion.

5. The bracket of claim 2 wherein the recessed surface portion formed in the first surface of the saddle mount body further comprises an arcuate recess.

6. The bracket of claim 2 wherein the clamping surface of the anvil further comprises an arched recess formed of first and second relatively inclined arched surfaces.

7. The bracket of claim 6 wherein the clamping surface of the anvil further comprises first and second substantially coplanar surfaces spaced apart on opposite sides of the arched recess.

8. The bracket of claim 7 wherein the anvil further comprises a pair of arcuate shoulder portions formed on opposite sides of the arcuate groove and terminating in the first and second substantially coplanar surfaces thereof.

9. A handlebar mounting bracket, comprising:
a substantially rigid saddle mount formed of an elongated body comprising substantially opposing and spaced apart opposing first and second surfaces with first and second spaced apart shoulder portions formed adjacent to opposing first and second ends of the elongated body, the first surface further comprising a recessed clamping surface portion formed substantially crosswise of a longitudinal axis of the elongated body and positioned substantially symmetrically between the spaced apart shoulder portions, and each of the shoulder portions further comprising an oblong aperture extending there through between the opposing first and second surfaces and having a major axis thereof substantially aligned with the longitudinal axis of the elongated body;
a part-spherical ball mount projected from the second surface of the saddle mount body substantially opposite from the recessed clamping surface portion thereof;
a U-bolt having first and second substantially straight and parallel partially threaded leg portions each being sized pass through the aperture in a respective one of the first and second shoulder portions of the saddle mount body and further being spaced apart a distance corresponding to a spacing between the apertures and interconnected by a substantially semi-circular throat portion;
a substantially rigid anvil comprising an external arcuate groove substantially corresponding to the semi-circular throat portion of the U-bolt and sized to nest therewith, the external arcuate groove terminating in a clamping surface sized to fit between the first and second leg portions of the rod and further comprising a pair of oppositely inclined arched flats forming therebetween an included angle; and
first and second nuts having female threads matched to male threads formed on the partially threaded leg portions of the U-bolt.

10. The bracket of claim 9 wherein the first surface of the saddle mount body further comprises first and second substantially coplanar surfaces adjacent to opposing first and second ends of the body spaced apart on opposite sides of the recessed clamping surface portion.

11. The bracket of claim 10 wherein the recessed clamping surface portion of the saddle mount body further comprises an arched recess.

12. The bracket of claim 11 wherein the arched recess of the saddle mount body further comprises first and second substantially planar surfaces being inclined relative to the respective first and second substantially coplanar surfaces of the first surface of the saddle mount body, the first and second inclined surfaces further forming an included angle there between.

13. The bracket of claim 10 wherein the recessed clamping surface portion of the saddle mount body further comprises an arcuate groove.

14. The bracket of claim 9 wherein the anvil further comprises a pair of substantially half-round shoulder portions formed on opposite sides of the external arcuate groove and terminating in the clamping surface and forming a pair of spaced apart substantially coplanar termination surfaces each having a portion thereof being substantially contiguous with a respective opposite end of the external arcuate groove; and
the clamping surface of the anvil further comprises a recessed clamping surface portion formed substantially symmetrically between the spaced apart termination surfaces and oriented substantially crosswise to the external arcuate groove.

15. The bracket of claim 14 wherein the recessed clamping surface portion of the anvil further comprises an arched recess.

16. The bracket of claim 15 wherein the arched recess of the anvil further comprises first and second substantially planar surfaces being inclined relative to the respective first and second substantially coplanar surfaces of the clamping surface of the anvil, the first and second inclined surfaces further forming an included angle there between.

17. The bracket of claim 14 wherein the arched recess of the anvil further comprises an internal arcuate recess.

18. A handlebar mounting bracket, comprising:
a substantially rigid saddle mount formed of an oblong body having spaced apart opposing first and second surfaces with first and second spaced apart shoulder portions formed adjacent to opposing first and second ends of the elongated body, the first surface further comprising a clamping surface portion recessed thereinto substantially crosswise of a longitudinal axis of the elongated body and positioned substantially symmetrically between the spaced apart shoulder portions and first and second substantially coplanar surfaces adjacent to the opposing first and second ends of the body and being spaced apart on opposite sides of the recessed clamping surface portion, the second surface being formed with a boss projected therefrom substantially symmetrically positioned between the spaced apart shoulder portions, and each of the shoulder portions further comprising a respective an oblong aperture extending there through between the opposing first and second surfaces and having a major axis thereof substantially oriented along and aligned with the longitudinal axis of the elongated body;
a part-spherical ball mount projected from the boss on the second surface of the saddle mount body, the part-spherical ball mount being formed of a resiliently deformable material with a substantially smooth outer surface;

a substantially rigid anvil comprising a substantially semi-circular external arcuate groove having a diameter substantially corresponding to a spacing between the apertures in the saddle mount body, the external arcuate groove being formed between a pair of substantially half-round shoulder portions and terminating in a pair of first and second spaced apart substantially coplanar termination surfaces each having a portion thereof being substantially contiguous with a respective opposite first and second end of the external arcuate groove, and a clamping surface portion formed between the termination surfaces and being recessed relative thereto and oriented substantially crosswise of external arcuate groove;

a substantially rigid U-bolt having a semi-circular throat portion formed to nest with the semi-circular external arcuate groove of the anvil, and a pair of substantially straight and parallel at least partially threaded leg portions projected from the throat portion, the leg portions being spaced apart a distance corresponding to a spacing between the apertures in the saddle mount body and each being sized pass through the aperture in a respective one of the first and second shoulder portions thereof the; and first and second nuts having female threads matched to male threads formed on the leg portions of the U-bolt.

19. The bracket of claim 18 wherein the recessed clamping surface portion of the anvil further comprises an arched recess formed of first and second substantially planar surfaces inclined relative to the respective first and second substantially coplanar termination surfaces of the anvil and further forming an included angle there between.

20. The bracket of claim 19 wherein the recessed clamping surface portion of the anvil further comprises an arcuate groove.

* * * * *